(12) United States Patent
Kim et al.

(10) Patent No.: US 11,932,188 B2
(45) Date of Patent: Mar. 19, 2024

(54) AIRBAG DEPLOYMENT SYSTEM OF VEHICLE AND AIRBAG DEPLOYMENT METHOD THEREOF

(71) Applicants: Hyundai Motor Company, Seoul (KR); Kia Corporation, Seoul (KR)

(72) Inventors: Hyung Joo Kim, Busan (KR); Haeng Kyeom Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 127 days.

(21) Appl. No.: 17/828,722

(22) Filed: May 31, 2022

(65) Prior Publication Data

US 2023/0211747 A1 Jul. 6, 2023

(30) Foreign Application Priority Data

Dec. 30, 2021 (KR) ........................ 10-2021-0193256

(51) Int. Cl.
| | |
|---|---|
| *B60R 21/015* | (2006.01) |
| *B60N 2/06* | (2006.01) |
| *B60N 2/14* | (2006.01) |
| *B60N 2/22* | (2006.01) |
| *B60R 21/0136* | (2006.01) |

(Continued)

(52) U.S. Cl.
CPC .......... *B60R 21/01554* (2014.10); *B60N 2/06* (2013.01); *B60N 2/14* (2013.01); *B60N 2/22* (2013.01); *B60R 21/0136* (2013.01); *B60R 21/205* (2013.01); *B60R 21/207* (2013.01); *B60R 2021/23107* (2013.01)

(58) Field of Classification Search
CPC .......... B60R 21/01554; B60R 21/0136; B60R 21/205; B60R 21/207; B60R 2021/23107; B60R 21/01512; B60R 21/233; B60R 21/203; B60R 2021/0004; B60R 2021/2078; B60N 2/06; B60N 2/14; B60N 2/22; B60N 2/0272; B60N 2/143
See application file for complete search history.

(56) References Cited

U.S. PATENT DOCUMENTS 5,893,582 A * 4/1999 Allen ................... B60N 2/002
   280/735
5,954,360 A * 9/1999 Griggs, III ............. G01S 15/04
   280/735

(Continued)

*Primary Examiner* — Phutthiwat Wongwian
*Assistant Examiner* — Susan E Scharpf
(74) *Attorney, Agent, or Firm* — Fox Rothschild LLP

(57) ABSTRACT

Provided are an airbag deployment system of a vehicle and an airbag deployment method thereof. The airbag deployment system includes a rear-viewable seat rotatably installed in a front row of the vehicle; a seat state detection unit configured to measure a rear-facing state, a current slide amount, and a backrest angle of the rear-viewable seat; a multiple-airbag unit that includes a first airbag installed in a backrest of the rear-viewable seat and configured to deploy rearward, and a second airbag installed in a dashboard; and a controller configured to, when a vehicle collision event occurs in the rear-facing state of the rear-viewable seat, calculate a distance between the dashboard and the backrest by using the current slide amount and the backrest angle, and selectively deploy at least one airbag according to a preset multiple-airbag deployment condition for each range based on the calculated distance.

15 Claims, 8 Drawing Sheets

(51) Int. Cl.
*B60R 21/205* (2011.01)
*B60R 21/207* (2006.01)
*B60R 21/231* (2011.01)

(56) References Cited

U.S. PATENT DOCUMENTS

| | | | |
|---|---|---|---|
| 6,227,563 B1* | 5/2001 | Talisman | B60R 21/00 |
| | | | 280/735 |
| 10,252,693 B2* | 4/2019 | Numazawa | B60R 21/23138 |
| 11,407,335 B2* | 8/2022 | Tanabe | B60R 21/23138 |
| 2018/0281626 A1* | 10/2018 | Murakami | B60N 2/42745 |
| 2019/0111880 A1* | 4/2019 | Choi | B60R 21/013 |
| 2019/0118754 A1* | 4/2019 | Dry | B60R 21/207 |
| 2019/0225184 A1* | 7/2019 | Ohno | B60R 21/23138 |
| 2019/0299895 A1* | 10/2019 | Herbert | B60R 21/01554 |
| 2019/0299897 A1* | 10/2019 | Gramenos | B60N 2/4279 |
| 2019/0303729 A1* | 10/2019 | Gramenos | G06V 20/593 |
| 2020/0122665 A1* | 4/2020 | Shin | B60R 21/233 |
| 2020/0122674 A1* | 4/2020 | Chen | B60R 21/231 |
| 2020/0122676 A1* | 4/2020 | Sekizuka | B60N 2/4279 |
| 2020/0130627 A1* | 4/2020 | Imura | B60R 21/201 |
| 2020/0130632 A1* | 4/2020 | Sekizuka | B60R 21/231 |
| 2020/0215938 A1* | 7/2020 | Tanabe | B60R 21/207 |
| 2020/0269790 A1* | 8/2020 | Sekizuka | B60R 22/28 |
| 2020/0377052 A1* | 12/2020 | Youssef-Agha | B60R 21/231 |
| 2021/0024027 A1* | 1/2021 | Kanegae | B60R 21/231 |

\* cited by examiner

AIRBAG DEPLOYMENT SYSTEM OF VEHICLE AND AIRBAG DEPLOYMENT METHOD THEREOF

CROSS-REFERENCE TO RELATED APPLICATION

This application is based on and claims the benefit of Korean Patent Application No. 10-2021-0193256 filed in the Korean Intellectual Property Office on Dec. 30, 2021, the entire contents of which are incorporated herein by reference.

TECHNICAL FIELD

Embodiments of the present disclosure relate to an airbag deployment system of a vehicle and an airbag deployment method thereof.

DESCRIPTION OF THE RELATED ART

Recently, as the interior of a vehicle is recognized as a living space where users take a break, leisure, meeting, and sleeping, a rear-viewable seat that may slide, rotate, and adjust the angle of the backrest for multiple purposes is designed to increase the usability.

Such a rear-viewable seat rotated to a rear-facing state enables a conversation and a meeting while a front seat passenger and a rear seat passenger face-to-face.

Meanwhile, in the rear-facing state (i.e., face-to-face mode) of the rear-viewable front seat provided in the vehicle, a forward collision may cause a more possibility of an injury to the head and chest of a passenger due to a contact load between the dashboard and the backrest during a forward collision In the case of the forward collision of a vehicle provided with an airbag installed in the dashboard, the airbag may contribute to absorption of the impact between the dashboard and the backrest of the rear-viewable seat. However, such an impact absorption of the airbag may depend on the arrangement or position of the rear-viewable seat, and is not always satisfactory.

For example, FIG. 5 illustrates airbag deployment situations of a vehicle when the seat is in a rear-facing state.

As shown in FIG. 5A, when the distance between the dashboard and the backrest at the forward collision is sufficient for the deployment size of the airbag, the airbag may be fully deployed and sufficient impact absorbing performance may be provided to secure the safety of the front occupant.

However, it is notable that the distance between the dashboard and the backrest may vary according to the position and the backrest angle of the seat adjusted by the user, and thus the optimal impact absorbing performance is not always expected.

For example, as shown in FIG. 5B, when the distance between the dashboard and the backrest is smaller than the deployment size of the airbag, the airbag may only be partially deployed at the collision to deteriorate the impact absorbing performance or may apply an additional impact to the backrest of the rear-viewable seat by the deployment of the airbag.

SUMMARY

An airbag deployment system of a vehicle includes a rear-viewable seat, a seat state detection unit, a multiple-airbag unit, and a controller. The rear-viewable seat may be rotatably installed in a front row of the vehicle. The seat state detection unit is configured to measure a rear-facing state, a current slide amount, and a backrest angle of the rear-viewable seat. The multiple-airbag unit may include a first airbag installed in a backrest of the rear-viewable seat and configured to deploy rearward, and a second airbag installed in a dashboard. The controller may be configured to, when a vehicle collision event occurs in the rear-facing state of the rear-viewable seat, calculate a distance between the dashboard and the backrest by using the current slide amount and the backrest angle, and selectively deploy at least one airbag according to a preset multiple-airbag deployment condition for each range based on the calculated distance.

The rear-viewable seat may be configured as at least one of a driver seat and a passenger seat.

The rear-viewable seat may be rotatable and capable of posture conversion among front-facing, lateral-facing, and rear-facing.

The seat state detection unit may include a posture measurement sensor configured to identify a front-facing posture or a rear-facing posture according to a seat rotation angle of the rear-viewable seat, a position measurement sensor configured to measure the slide amount of the rear-viewable seat, and a recline angle sensor configured to measure the backrest angle of the rear-viewable seat.

The position measurement sensor may be configured to measure the slide amount of the rear-viewable seat that moves forward or backward and transmit the measured slide amount to the controller.

The controller may be configured to determine the collision event when a collision severity measured by a collision sensor satisfies a preset airbag deployment condition.

The controller may be configured to set the multiple-airbag deployment condition for each range by dividing the distance between the dashboard and the backrest adjustable by a user into a plurality of ranges, based on deployment sizes of the first airbag and the second airbag.

The plurality of ranges of the multiple-airbag deployment condition may include a first range corresponding to a deployment size of the first airbag, a second range corresponding to a deployment size of the second airbag, and a third range that is a sum of the first range and the second range.

The controller may be configured to deploy only the first airbag when the distance between the dashboard and the backrest is within the first range.

The controller may be configured to deploy only the second airbag corresponding to the second range when the distance between the dashboard and the backrest is above the first range but below the third range, and simultaneously deploy the first airbag and the second airbag when the distance between the dashboard and the backrest is above the first range and also above the third range.

An airbag deployment method is applied to a vehicle installed with a rear-viewable seat in a front row. The airbag deployment method includes determining a collision event of the vehicle, measuring a rear-facing state, a current slide amount, and a backrest angle of the rear-viewable seat through a seat state detection unit, calculating a distance between a dashboard and a backrest of rear-viewable seat by using the current slide amount and the backrest angle, and selectively deploying at least one airbag of a first airbag installed in the backrest of the rear-viewable seat and configured to deploy rearward, and a second airbag installed in the dashboard, according to a preset multiple-airbag deployment condition for each range based on the calculated distance.

The preset multiple-airbag deployment condition may include a first range corresponding to a deployment size of the first airbag, a second range corresponding to a deployment size of the second airbag, and a third range that is a sum of the first range and the second range.

The selectively deploying may include, when the distance between the dashboard and the backrest is within the first range, deploying the first airbag corresponding to the first range, and maintaining the second airbag not deployed.

The selectively deploying may include, when the distance between the dashboard and the backrest is above the first range but below the third range, deploying the second airbag corresponding to the second range, and maintaining the first airbag not deployed.

The selectively deploying may include, when the distance between the dashboard and the backrest is above the first range and also above the third range, simultaneously deploying the first airbag and the second airbag.

According to an exemplary embodiment, upon a collision of the vehicle, the airbag of the size that may be fully deployed under the current distance between the dashboard and the backrest may be selectively operated, and thereby optimal impact absorbing performance may always be achieved.

In addition, by real-time identifying the state information adjusted by the user, a multiple-airbag deployment strategy adaptive to the distance between the dashboard and the backrest may be provided, and thereby collision safety may be improved.

In addition, the safety of the occupant on the rear-viewable seat may be improved through the software without employing additional component parts, and thereby product competitiveness and customer satisfaction may be improved.

DETAILED DESCRIPTION OF THE EMBODIMENTS

Figure 1:
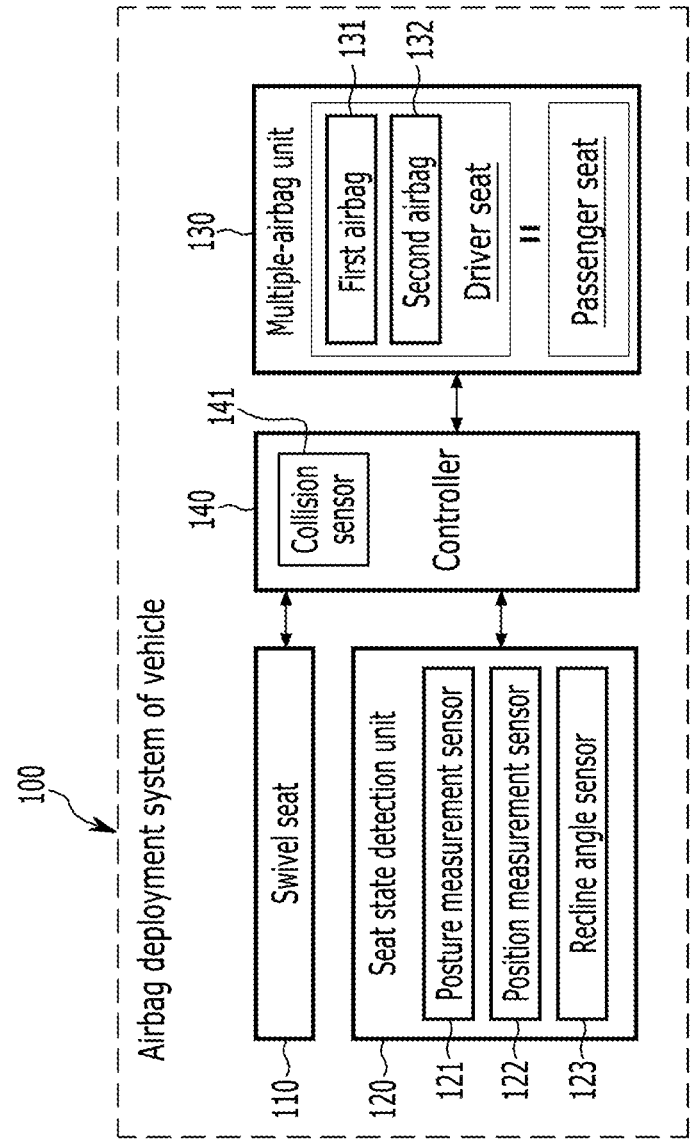
FIG. 1 is a block diagram for schematically illustrating a configuration of an airbag deployment system of a vehicle according to an exemplary embodiment.

In the following detailed description, only certain exemplary embodiments of the present disclosure have been shown and described, simply by way of illustration.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence, or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may be configured to control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of embodiments of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, an airbag deployment system of a vehicle and an airbag deployment method thereof according to an exemplary embodiment is described in detail with reference to the drawings.

FIG. 1 is a block diagram for schematically illustrating a configuration of an airbag deployment system of a vehicle according to an exemplary embodiment.

Figure 2:
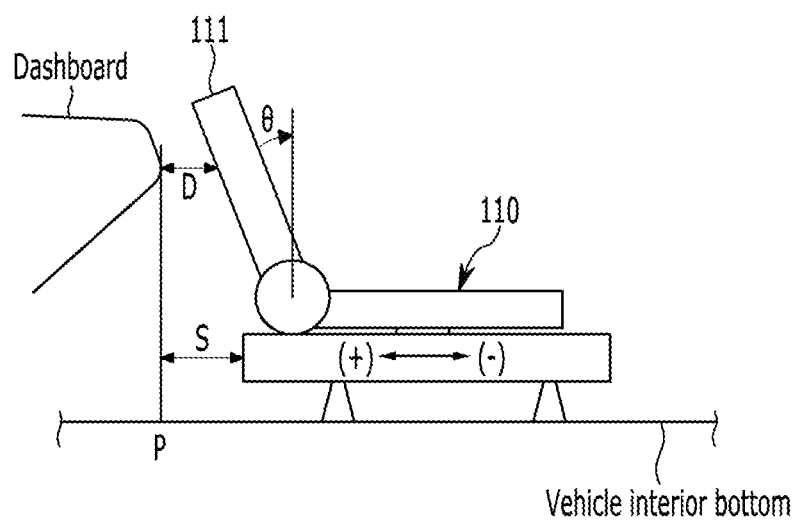
FIG. 2 illustrates an installation structure of a rear-viewable seat according to an exemplary embodiment.

FIG. 2 illustrates an installation structure of a rear-viewable seat according to an exemplary embodiment.

Referring to FIG. 1, an airbag deployment system 100 of a vehicle according to an exemplary embodiment may include a rear-viewable seat 110, a seat state detection unit 120, a multiple-airbag unit 130, and a controller 140. The rear-viewable seat 110 may be rotatably installed in a front row of the vehicle. The seat state detection unit 120 may be configured to measure a rear-facing state, a current slide amount S, and a backrest angle θ of the rear-viewable seat 110. The multiple-airbag unit 130 may include a first airbag 131 installed in a backrest 111 of the rear-viewable seat 110 and may be configured to deploy rearward, and a second airbag 132 installed in a dashboard. The controller 140 may be configured to, when a vehicle collision event occurs in the rear-facing state of the rear-viewable seat 110, calculate a distance D between the dashboard and the backrest 111 by using the current slide amount S and the backrest angle θ, and selectively deploy at least one airbag according to a preset multiple-airbag deployment condition for each range based on the calculated distance D.

The vehicle may be, for example, a vehicle applied with a fully autonomous driving system by which the vehicle may run by itself without a control of a driver by being equipped with, for example, a camera, a lidar, a radar, an ultrasonic wave sensor, and the like. In this case, the rear-viewable seat may also be applied to a driver seat as well as a passenger seat, and it may be understood that embodiments of the present disclosure may be applied to a vehicle with such a rear-viewable seat.

That is, the rear-viewable seat 110 may be configured as at least one of the driver seat and the passenger seat in the vehicle interior. Here, the passenger seat means a seat positioned at a front row in parallel with the driver seat.

The rear-viewable seat 110 may swivel or be rotatable, e.g., up to 180 degrees at maximum, and may convert a posture among front-facing, lateral-facing, and rear-facing by rotating by corresponding degrees. It may be understood that the swiveling or rotating scheme is not limited in the rear-viewable seat 110 according to an exemplary embodiment.

In addition, the rear-viewable seat 110 may move forward or backward along a slide rail 55 formed on a vehicle interior bottom, and is provided with a recliner function in which the backrest angle of the rear-viewable seat 110 may be adjusted.

The rear-viewable seat 110 may be applied to various types of vehicles, such as an electric vehicle, a fuel cell vehicle, a hybrid electric vehicle, and an internal combustion engine vehicle.

The seat state detection unit 120 detects a current state of the rear-viewable seat 110, and includes a posture measurement sensor 121, a position measurement sensor 122, and a recline angle sensor 123.

The posture measurement sensor 121 may identify a front-facing posture or a rear-facing posture according to a seat rotation angle of the rear-viewable seat 110 adjusted by the user.

The position measurement sensor 122 may measure the slide amount S of the rear-viewable seat 110 adjusted by the user.

The recline angle sensor 123 may measure the backrest angle θ of the rear-viewable seat 110 adjusted by the user.

The seat state detection unit 120 may be separately provided to the rear-viewable seat 110 of the driver seat and/or the passenger seat, and collects information measured by respective sensors to transmit the information to the controller 140.

The position measurement sensor 122 may measure the slide amount S of the rear-viewable seat 110 that moves forward or backward along the slide rail 55, and transmit the measured data to the controller 140.

The multiple-airbag unit 130 may include a set of the first airbag 131 and the second airbag 132, and may be separately provided to each of the driver seat and the passenger seat.

The first airbag 131 may be a backrest airbag installed in the backrest 111 of the rear-viewable seat 110, e.g., at the height of the driver or the passenger, and is deployed rearward at an occurrence of the collision event. Such a first airbag 131 may protect a rear seat occupant when deployed at the front-facing posture of the rear-viewable seat 110 (i.e., when facing forward), and may protect a front seat occupant when deployed at the rear-facing posture of the rear-viewable seat 110 (i.e., when rotated by 180 degrees toward the rear seat).

The second airbag 132 may include a driver seat airbag and a passenger seat airbag installed in the dashboard, and may protect the front seat occupant (i.e., the driver and the passenger) when deployed at a collision.

The deployment size of the backrest airbag corresponding to the first airbag 131 is typically smaller than the deployment size of the driver seat airbag and the passenger seat airbag corresponding to the second airbag 132. Here, the deployment size may mean the deployed thickness or width of the airbag.

The controller 140 may be configured to control an overall operation of the airbag deployment system 100 of a vehicle according to an exemplary embodiment, and store at least one program data for the overall operation.

The controller 140 may be configured to determine the collision event when collision severity measured by a collision sensor 141 satisfies a preset airbag deployment condition, e.g., upon a forward collision of the vehicle. For this purpose, the controller 140 may be configured to be in communication with the collision sensor 141 provided in the vehicle.

The controller 140 may be configured to divide, at the rear-facing state of the rear-viewable seat 110, the distance D between the dashboard (e.g., an end P of the dashboard) and the backrest 111 into a plurality of ranges.

Figure 3A:
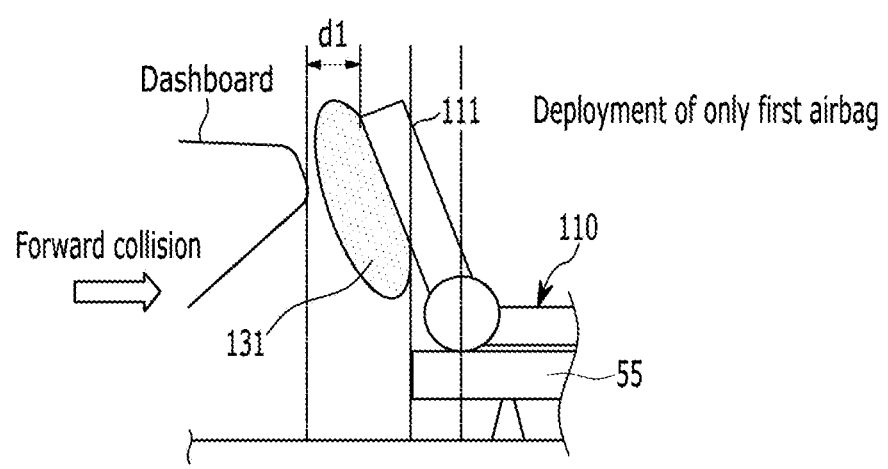
FIG. 3A illustrates the deployment of only first airbag.
Figure 3B:
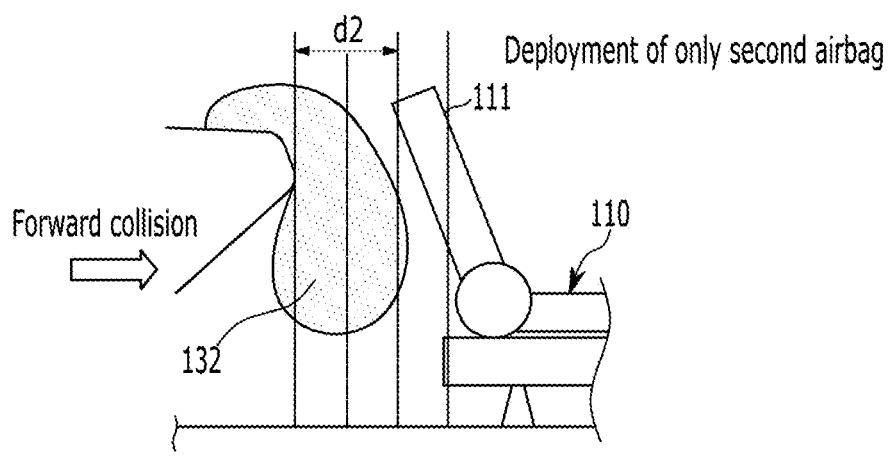
FIG. 3B illustrates the deployment of only second airbag.
Figure 3C:
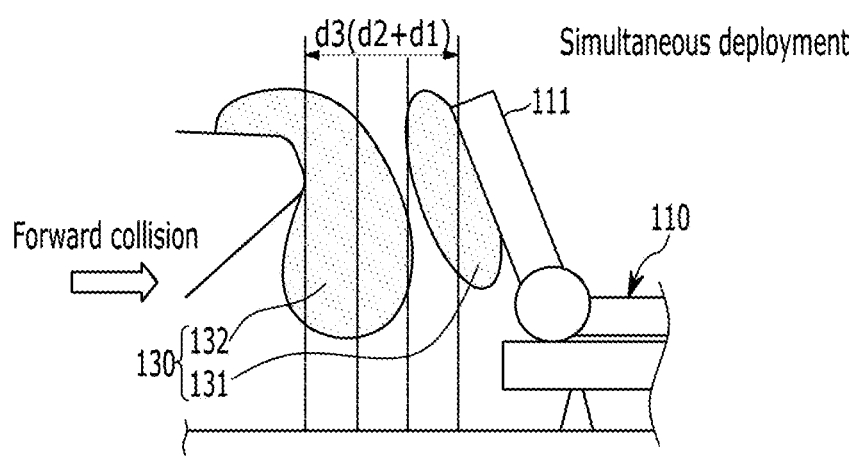
FIG. 3C illustrates the simultaneous deployment of first airbag and second airbag.

For example, FIG. 3 illustrates a plurality of ranges of a distance between the dashboard and the backrest 111 according to an exemplary embodiment.

Referring to FIG. 3, based on deployment sizes of the first airbag 131 and the second airbag 132, the controller 140 may be configured to divide the distance D between the dashboard and the backrest 111 into a plurality of ranges, at the rear-facing posture state of the rear-viewable seat 110.

That is, based on deployment sizes of the first airbag 131 and the second airbag 132, the controller 140 may be configured to set the multiple-airbag deployment condition for each range by dividing the distance D between the dashboard and the backrest 111 adjustable by the user into a plurality of ranges d1, d2, and d3.

For example, the plurality of ranges d1, d2, and d3 of the multiple-airbag deployment condition may include a first range d1 corresponding to a deployment size of the first airbag 131, a second range d2 corresponding to a deployment size of the second airbag 132, and a third range d3 that is a sum of the second range d2 and the first range d1.

At the occurrence of the collision event of the vehicle, the controller 140 may be configured to calculate the distance D between the dashboard and the backrest 111 by using the current slide amount S and the backrest angle θ.

In addition, the controller 140 may be configured to selectively control, according to the multiple-airbag deployment condition for each range based on the calculated distance D between the dashboard and the backrest 111, deployment of only the first airbag 131, deployment of only the second airbag 132, and simultaneously deployment of the first airbag 131 and the second airbag 132.

That is, when the collision event of the vehicle occurs, the controller 140 may be configured to selectively deploy the airbag of the size appropriate to the current distance D between the dashboard and the backrest 111, and thereby may always provide optimal impact absorbing performance even if the position/posture of the seat is adjusted by the user.

The controller 140 may be implemented as at least one processor operated by a preset program, and the preset program may be programed to execute each step of an airbag deployment method of a vehicle according to an exemplary embodiment.

Hereinafter, an airbag deployment method of a vehicle will be described in detail with reference to the drawings. It is notable that the controller 140 has set the multiple-airbag deployment condition as described above with reference to FIG. 3.

Figure 4:
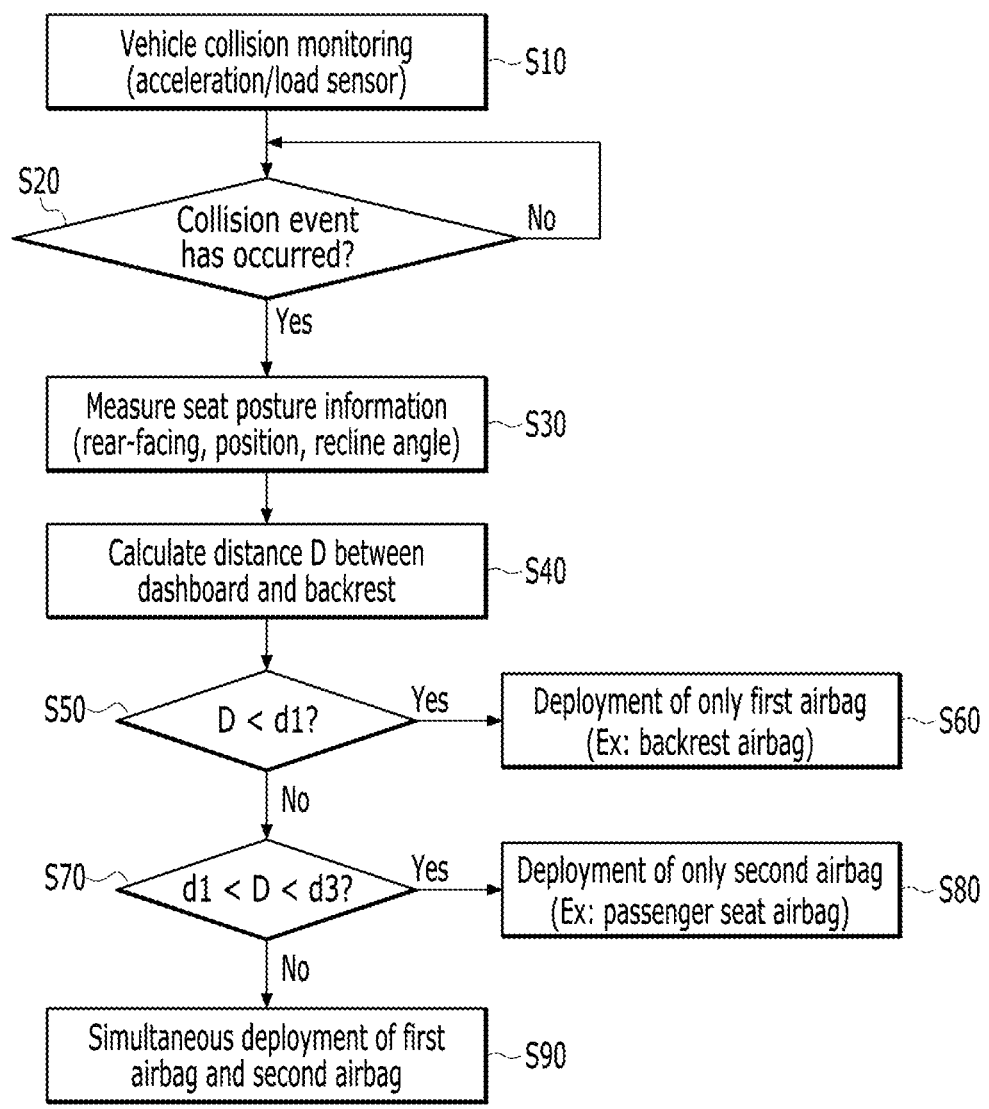
FIG. 4 is a flowchart showing an airbag deployment method of a vehicle according to an exemplary embodiment.
Figure 5A:
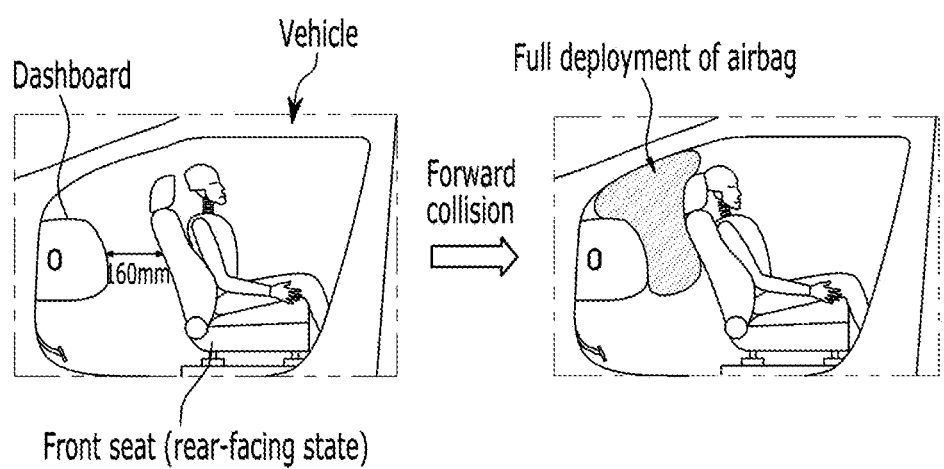
FIG. 5A illustrates airbag deployment situations of a vehicle when the distance between the dashboard and the backrest at the forward collision is sufficient for the deployment size of the airbag.
Figure 5B:
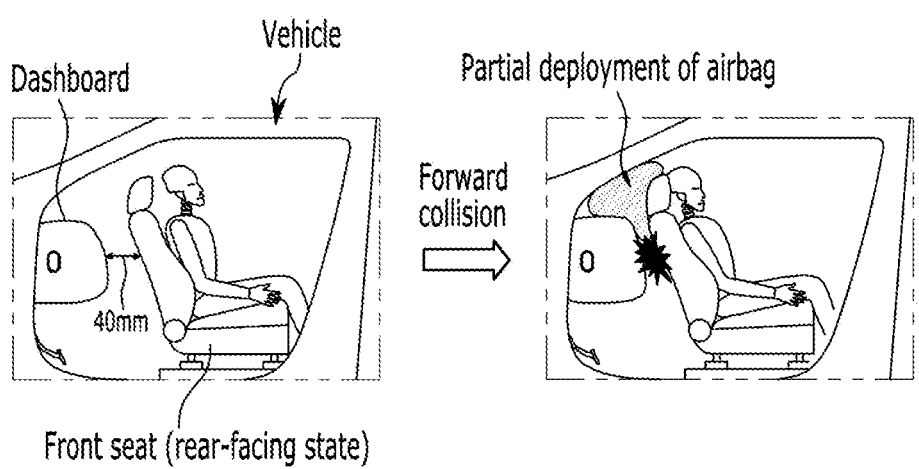
FIG. 5B, illustrates airbag deployment situations of a vehicle when the distance between the dashboard and the backrest is smaller than the deployment size of the airbag.

FIG. 4 is a flowchart showing an airbag deployment method of a vehicle according to an exemplary embodiment.

Referring to FIG. 4, at step S10, the controller 140 of the airbag deployment system 100 of a vehicle according to an exemplary embodiment may be configured to monitor the occurrence of the collision event through the collision sensor 141 while the vehicle is running. The collision sensor 141 may measure the collision severity (i.e., how severe the collision is), and for example, the collision severity may be measured in terms of at least level of acceleration/deceleration, impact load, and vibration.

At this time, at step S20, the controller 140 may be configured to determine whether the collision severity measured by the collision sensor 141 satisfies the preset airbag deployment condition. When the collision severity measured by the collision sensor 141 does not satisfy the preset airbag deployment condition, the controller 140 may be configured to determine non-occurrence of the collision event (S20; No), and continues the monitoring.

The airbag deployment condition may be appropriately preset by a person skilled in the art, for example, in consideration of vehicle specification, design factors, and the like.

On the other hand, when the collision severity measured by the collision sensor 141 may satisfy the preset airbag deployment condition, the controller 140 may be configured to determine the occurrence of the collision event (S20; Yes), and at step S30, measure the rear-facing state, the current slide amount S, and the backrest angle θ of the rear-viewable seat through the seat state detection unit 120.

In addition, at step S40, in the rear-facing state of the rear-viewable seat, the controller 140 may be configured to calculate the distance D between the dashboard and the backrest 111 by using the current slide amount S and the backrest angle θ.

In addition, the controller 140 may be configured to selectively deploy at least one airbag of the first airbag 131 installed in backrest 111 of the rear-viewable seat 110 and configured to deploy rearward and the second airbag 132 installed in the dashboard, according to the preset multiple-airbag deployment condition for each range based on the calculated distance D.

For example, at step S50, the controller 140 may be configured to determine whether the distance D between the dashboard and the backrest 111 is within the first range d1. When the distance D between the dashboard and the backrest 111 is within the first range d1 (S50; Yes), the controller 140 may be configured to control, at step S60, the first airbag 131 corresponding to the first range d1 to be deployed, and controls the second airbag 132 not to be deployed (refer to FIG. 3A).

In addition, at step S70, the controller 140 may be configured to determine whether the distance D between the dashboard and the backrest 111 is above the first range d1 but below the third range d3. When the distance D between the dashboard and the backrest 111 is above the first range d1 but below the third range d3 (S70; Yes), the controller 140 may be configured to control, at step S80, the second airbag 132 corresponding to the second range d2 to be deployed, and controls the first airbag 131 not to be deployed (refer to FIG. 3B).

On the other hand, the distance D between the dashboard and the backrest 111 is above the first range d1 and also above the third range d3 (S70; No), the controller 140 may be configured to control, at step S90, the first airbag 131 and the second airbag 132 to be simultaneously deployed (refer to FIG. 3C).

As such, according to an exemplary embodiment, upon a collision of the vehicle, the airbag of the size that may be fully deployed under the current distance between the dashboard and the backrest may be selectively operated, and thereby optimal impact absorbing performance may always be achieved.

In addition, by real-time identifying the state information adjusted by the user, a multiple-airbag deployment strategy adaptive to the distance between the dashboard and the backrest may be provided, and thereby collision safety may be improved.

In addition, the safety of the occupant on the rear-viewable seat may be improved through the software without employing additional component parts, and thereby product competitiveness and customer satisfaction may be improved.

The exemplary embodiments of the present disclosure described above are not only implemented by the apparatus and the method, but may be implemented by a program for realizing functions corresponding to the configuration of the embodiments of the present disclosure or a recording medium on which the program is recorded.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

| | |
|---|---|
| 100: airbag deployment system | 110: rear-viewable seat |
| 111: backrest | 120: seat state detection unit |
| 121: posture measurement sensor | 122: position measurement sensor |
| 123: recline angle sensor | 130: multiple-airbag unit |
| 131: first airbag | 132: second airbag |
| 140: controller | 141: collision sensor |

What is claimed is:

1. An airbag deployment system of a vehicle, comprising:
a rear-viewable seat rotatably installed in a front row of the vehicle;
a seat state detection unit configured to measure a rear-facing state, a current slide amount, and a backrest angle of the rear-viewable seat;
a multiple-airbag unit comprising:
a first airbag installed in a backrest of the rear-viewable seat and configured to deploy rearward, and
a second airbag installed in a dashboard; and
a controller configured to, when a vehicle collision event occurs in the rear-facing state of the rear-viewable seat:
calculate a distance between the dashboard and the backrest by using the current slide amount and the backrest angle, and
selectively deploy at least one of the airbags, according to a preset multiple-airbag deployment condition for each range based on the calculated distance.

2. The airbag deployment system of claim 1, wherein the rear-viewable seat is configured as at least one of a driver seat and a passenger seat.

3. The airbag deployment system of claim 1, wherein the rear-viewable seat is rotatable and capable of posture conversion among front-facing, lateral-facing, and rear-facing.

4. The airbag deployment system of claim 1, wherein the seat state detection unit comprises:
a posture measurement sensor configured to identify a front-facing posture or a rear-facing posture according to a seat rotation angle of the rear-viewable seat;
a position measurement sensor configured to measure the slide amount of the rear-viewable seat; and
a recline angle sensor configured to measure the backrest angle of the rear-viewable seat.

5. The airbag deployment system of claim 4, wherein the position measurement sensor is configured to measure the slide amount of the rear-viewable seat that moves forward or backward and transmit the measured slide amount to the controller.

6. The airbag deployment system of claim 1, wherein the controller is further configured to determine the collision event when a collision severity measured by a collision sensor satisfies a preset airbag deployment condition.

7. The airbag deployment system of claim 1, wherein the controller is further configured to set the multiple-airbag deployment condition for each range by dividing the distance between the dashboard and the backrest adjustable by a user into a plurality of ranges, based on deployment sizes of the first airbag and the second airbag.

8. The airbag deployment system of claim 7, wherein the plurality of ranges of the multiple-airbag deployment condition comprises:
a first range corresponding to a deployment size of the first airbag;
a second range corresponding to a deployment size of the second airbag; and
a third range that is a sum of the first range and the second range.

9. The airbag deployment system of claim 8, wherein the controller is further configured to deploy only the first airbag when the distance between the dashboard and the backrest is within the first range.

10. The airbag deployment system of claim 8, wherein the controller is further configured to:
deploy only the second airbag corresponding to the second range when the distance between the dashboard and the backrest is above the first range but below the third range; and
simultaneously deploy the first airbag and the second airbag when the distance between the dashboard and the backrest is above the first range and also above the third range.

11. An airbag deployment method of a vehicle installed with a rear-viewable seat in a front row, the airbag deployment method comprising:
determining a collision event of the vehicle;
measuring a rear-facing state, a current slide amount, and a backrest angle of the rear-viewable seat through a seat state detection unit;
calculating a distance between a dashboard and a backrest of rear-viewable seat by using the current slide amount and the backrest angle; and
selectively deploying at least one airbag of a first airbag installed in the backrest of the rear-viewable seat and configured to deploy rearward, and a second airbag installed in the dashboard, according to a preset multiple-airbag deployment condition for each range based on the calculated distance.

12. The airbag deployment method of claim 11, wherein the preset multiple-airbag deployment condition comprises:
a first range corresponding to a deployment size of the first airbag;

a second range corresponding to a deployment size of the second airbag; and a third range that is a sum of the first range and the second range.

13. The airbag deployment method of claim 12, wherein the selectively deploying comprises, when the distance between the dashboard and the backrest is within the first range:

deploying the first airbag corresponding to the first range; and maintaining the second airbag not deployed.

14. The airbag deployment method of claim 13, wherein the selectively deploying comprises, when the distance between the dashboard and the backrest is above the first range but below the third range:

deploying the second airbag corresponding to the second range; and maintaining the first airbag not deployed.

15. The airbag deployment method of claim 14, wherein the selectively deploying comprises, when the distance between the dashboard and the backrest is above the first range and also above the third range:

simultaneously deploying the first airbag and the second airbag.

* * * * *